US008291275B2

(12) United States Patent
Miyoshi et al.

(10) Patent No.: US 8,291,275 B2
(45) Date of Patent: Oct. 16, 2012

(54) TRANSMISSION APPARATUS, ACCESS POINT AND SYMBOL TRANSMISSION METHOD

(75) Inventors: Kingo Miyoshi, Yokohama (JP); Mikio Kuwahara, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 727 days.

(21) Appl. No.: 12/474,593

(22) Filed: May 29, 2009

(65) Prior Publication Data

US 2009/0300454 A1   Dec. 3, 2009

(30) Foreign Application Priority Data

Jun. 2, 2008   (JP) ................................ 2008-144125

(51) Int. Cl.
    *H04L 1/06*   (2006.01)
(52) U.S. Cl. ........................................................ 714/748
(58) Field of Classification Search .................. 714/748, 714/749
    See application file for complete search history.

(56) References Cited

U.S. PATENT DOCUMENTS

| | | | | |
|---|---|---|---|---|
| 7,039,370 B2* | 5/2006 | Laroia et al. | .................. | 455/101 |
| 7,610,024 B2* | 10/2009 | Laroia et al. | .................. | 455/101 |
| 7,623,439 B2* | 11/2009 | Webster et al. | ............... | 370/203 |
| 7,710,319 B2* | 5/2010 | Nassiri-Toussi et al. | ...... | 342/377 |
| 7,729,432 B2* | 6/2010 | Khan et al. | .................... | 375/260 |
| 7,826,871 B2 | 11/2010 | Sudo | | |
| 7,855,993 B2* | 12/2010 | Mujtaba | ........................ | 370/334 |
| 7,864,903 B2 | 1/2011 | Murakami et al. | | |
| 7,865,153 B2* | 1/2011 | Khan et al. | .................... | 455/101 |
| 7,885,349 B2* | 2/2011 | Lee et al. | ........................ | 375/267 |
| 7,894,548 B2* | 2/2011 | Walton et al. | ................. | 375/299 |
| 7,916,081 B2* | 3/2011 | Lakkis | .......................... | 342/367 |
| 8,000,401 B2* | 8/2011 | Lee et al. | ........................ | 375/260 |
| 8,121,211 B2* | 2/2012 | Lou et al. | ........................ | 375/267 |
| 2010/0015927 A1 | 1/2010 | Yuda et al. | | |
| 2010/0054191 A1 | 3/2010 | Higuchi et al. | | |

FOREIGN PATENT DOCUMENTS

| | | |
|---|---|---|
| JP | 2005-354708 A | 12/2005 |
| JP | 2007-221746 A | 8/2007 |
| WO | 2005/050885 A1 | 6/2005 |
| WO | 2006/080317 A1 | 8/2006 |
| WO | 2007/117100 A1 | 10/2007 |
| WO | 2008/050745 A1 | 5/2008 |

* cited by examiner

*Primary Examiner* — Stephen M Baker
(74) *Attorney, Agent, or Firm* — Mattingly & Malur, P.C.

(57) ABSTRACT

In a transmission apparatus in a MIMO-OFDM communication system employing cyclic diversity, a cyclic delay controller sets plural delay magnitudes, different for respective antennas, in cyclic delayers for each predetermined timing. The cyclic delayers receive symbols subjected to orthogonal frequency division multiplexing, for the respective ones of plural allotted antennas. Additionally, the cyclic delayers bestow cyclic delays on the individual symbols of the respective antennas in accordance with plural set delay magnitudes. The symbols cyclically delayed are outputted from the antennas. As the delay magnitudes, a first delay magnitude at a first transmission timing and a second delay magnitude at a second transmission timing are different for one antenna, and the delay magnitudes differ in the respective antennas for one transmission timing. Thus, in a MIMO-OFDM transmission scheme, frequency diversity and time diversity are enhanced to heighten a retransmission efficiency in a data retransmission mode.

7 Claims, 9 Drawing Sheets

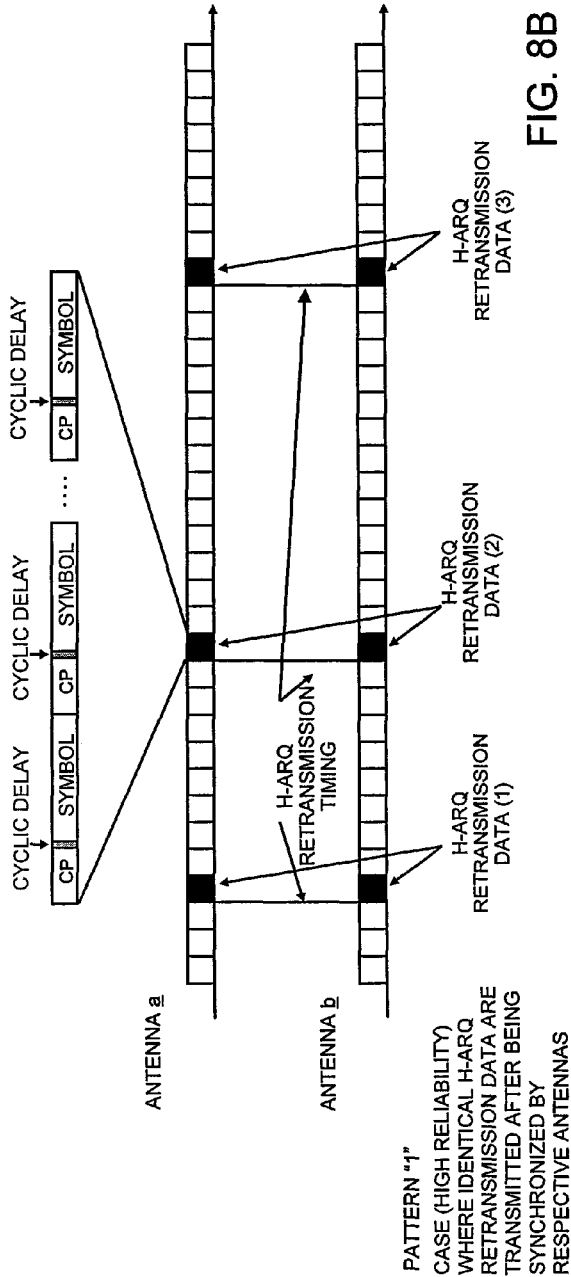

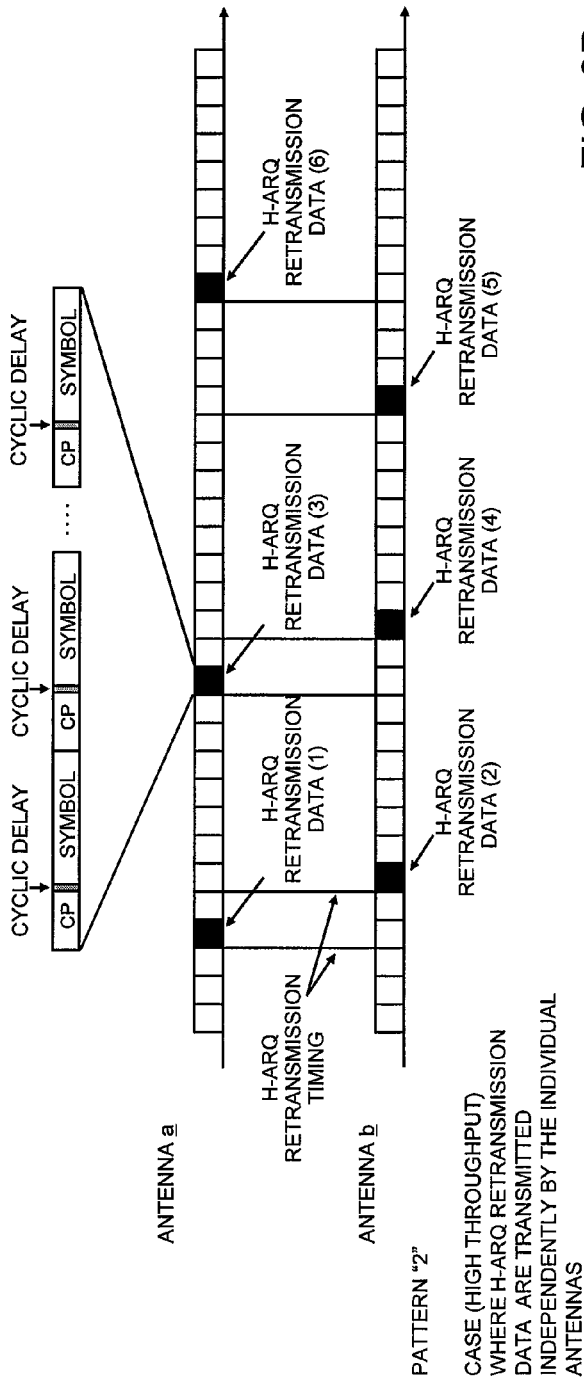

TRANSMISSION APPARATUS, ACCESS POINT AND SYMBOL TRANSMISSION METHOD

CLAIM OF PRIORITY

The present application claims priority from Japanese patent application JP 2008-144125 filed on Jun. 2, 2008, the content of which is hereby incorporated by reference into this application.

BACKGROUND OF THE INVENTION

1. Field of the Invention

The present invention relates to a transmission apparatus, an access point and a symbol transmission method. More particularly, it relates to a transmission apparatus, an access point and a symbol transmission method of high data retransmission efficiency in a MIMO-OFDM communication system which employs a cyclic delay diversity.

2. Description of the Related Art

An orthogonal frequency division multiplexing (OFDM) mobile communication system is a transmission scheme which has excellent characteristics in a broad bandwidth, a frequency utilization efficiency and a radio propagation withstand characteristic. Further, there is a multiple input and multiple output (MIMO)-OFDM transmission scheme wherein transmission signals are spatially multiplexed with transmission antennas and reception antennas in the OFDM, thereby to realize the enhancement of a transmission rate.

Also, as a transmission diversity scheme for error-correction-coded OFDM signals, there is a scheme wherein OFDM signals after an inverse Fourier transform or after a cyclic delay diversity in which individual transmission symbols are transmitted by performing cyclic delays different between the respectively adjacent antennas are time-shifted and are thereafter transmitted by inserting cyclic prefixes (CPs).

The signals which do not correlate between the respective antennas are transmitted by applying this scheme to the MIMO-OFDM transmission scheme, so that the transmission rate can be raised in proportion to the transmission antennas.

On the other hand, in transmitting broadcast data, there have been disclosed methods wherein the data is efficiently transmitted by employing the cyclic delay diversity (refer to, for example, Patent Document 1 being JP-A-2005-354708). Incidentally, the MIMO-OFDM transmission scheme has been adopted as the transmission scheme of next-generation mobile communications.

SUMMARY OF THE INVENTION

Usually, the unicast communications of portable telephones, etc. have a data retransmission function such as and automatic repeat request (ARQ). In the prior-art schemes of Patent Document 1, etc., however, the retransmission efficiency of a retransmission mode is not considered.

In view of the above point, the present invention has an object of providing a transmission apparatus, an access point and a symbol transmission method which raise a retransmission efficiency in a data retransmission mode by enhancing frequency diversity and time diversity in a MIMO-OFDM transmission scheme.

One of the objects of the invention is, in the process of an H-ARQ in fast radio communications, to control cyclic delay magnitudes by a cyclic delay controller, and transmit OFDM signals cyclically delayed with delay magnitudes which are different in respective antennas and for respective H-ARQ retransmissions, and obtain the frequency diversity by respectively changing frequency characteristics of transmission signals. In addition, one of the objects of the invention is to relieve the influence of frequency-selective fading, decrease the number of times of H-ARQ retransmissions utilizing the time diversity, and raise the retransmission efficiency. One of the objects of the invention is to decrease the number of times of the H-ARQ retransmissions by preventing a data omission in a specified path by the frequency diversity, raise a temporal retransmission efficiency, and make possible fast radio communications of high reliability.

In a MIMO-OFDM transmission scheme wherein an orthogonal frequency division multiplexing (OFDM) signal applying an H-ARQ (Hybrid-ARQ) in which channel encoding employing an error correction code (for example, turbo code) and an automatic repeat request (ARQ) are combined is spatially multiplexed, the present invention consists in a transmission apparatus which executes a cyclic delay diversity (CDD) for performing cyclic delays different at respective transmission timings and in respective transmission antennas so that respective transmission signals may become orthogonal when received, and in which cyclic delay magnitudes differing in the respective antennas and for respective H-ARQ retransmissions are afforded by a cyclic delay controller included in the transmission apparatus, thereby to generate OFDM signals whose phases are respectively different. Accordingly, the frequency characteristic of a signal waveform synthesized by respective reception antennas changes every transmission (for example, every H-ARQ retransmission).

A method for transmitting symbols in the present invention is a method in which data is transmitted and retransmitted by employing a cyclic diversity in, for example, an OFDM communication system, and as one feature thereof, it includes:

the step of setting delay values that are different for respective symbols or frames in individual antennas of a transmission apparatus;

the step of generating OFDM signals that contain the data, in the transmission apparatus;

the step of delaying the individual OFDM signals with delay values that are different in the respective antennas and for the respective symbols; and the step of transmitting the plurality of delayed OFDM signals by using the respective antennas.

The transmission apparatus of the present invention includes a cyclic delay controller which has the function of allotting delay magnitudes different for the respective symbols or frames in the individual antennas, in an apparatus which transmits and retransmits data by employing a cyclic diversity in, for example, a MIMO-OFDM communication system.

Besides, the transmission apparatus includes cyclic delayers which cyclically delay the respective symbols in the individual antennas with the allotted delay magnitudes.

By way of example, values are fetched from a storage medium which retains random delay magnitudes or delay magnitudes having fixed patterns and are inputted to the cyclic delayers under the control of the cyclic delay controller.

Alternatively, the delay magnitudes are altered in synchronism with, for example, the timing signal of each transmission and retransmission of an H-ARQ which is inputted from an H-ARQ controller.

According to a first solving means of this invention, there is provided a transmission apparatus which transmits and retransmits data by employing a cyclic diversity in a communication system wherein data is spatially multiplexed using a plurality of antennas and wherein communications are performed by orthogonal frequency division multiplexing, comprising:

a symbol generation portion which multiplexes data by orthogonal frequency division multiplexing, and assigning the plurality of antennas to the data to generate symbols of respective antennas;

a cyclic delay controller which sets a plurality of delay magnitudes different for the respective antennas, for each predetermined timing;

a cyclic delayer which bestows cyclic delays on the individual symbols of the respective antennas, in accordance with the plurality of delay magnitudes set by said cyclic delay controller; and a transmission portion which outputs the cyclically delayed symbols from the antennas;

wherein as the delay magnitudes, a first delay magnitude at a first transmission timing and a second delay magnitude at a second transmission timing are different for one antenna, and the delay magnitudes are different in the respective antennas for one transmission timing.

According to a second solving means of this invention, there is provided an access point comprising:

a transmission apparatus which transmits and retransmits data by employing a cyclic diversity in a communication system wherein data is spatially multiplexed using a plurality of antennas and wherein communications are performed by orthogonal frequency division multiplexing, the transmission apparatus comprising a symbol generation portion which multiplexes data by orthogonal frequency division multiplexing, and assigning the plurality of antennas to the data to generate symbols of respective antennas, a cyclic delay controller which sets a plurality of delay magnitudes different for the respective antennas, for each predetermined timing, a cyclic delayer which bestows cyclic delays on the individual symbols of the respective antennas, in accordance with the plurality of delay magnitudes set by said cyclic delay controller; and a transmission portion which outputs the cyclically delayed symbols from the antennas, wherein as the delay magnitudes, a first delay magnitude at a first transmission timing and a second delay magnitude at a second transmission timing are different for one antenna, and the delay magnitudes are different in the respective antennas for one transmission timing; and a reception apparatus which receives an acknowledgment notification that indicates data transmitted by the transmission apparatus has been normally received by a terminal, and/or a retransmission request that makes a request for retransmission of the data due to failure of the normal reception of the data at the terminal, from the terminal through the antennas;

wherein the data is retransmitted from the transmission apparatus to the terminal in a case where the acknowledgment notification is not received from the terminal within a predetermined time period, or in a case where the retransmission request has been received.

According to a third solving means of this invention, there is provided a symbol transmission method which transmits and retransmits data by employing a cyclic diversity in a communication system wherein data is spatially multiplexed using a plurality of antennas and wherein communications are performed by orthogonal frequency division multiplexing, the symbol transmission method comprising the steps of:

multiplexing data by orthogonal frequency division multiplexing, and assigning the plurality of antennas to the data to generate symbols of respective antennas;

setting a plurality of delay magnitudes different for the respective antennas, for each predetermined timing;

bestowing cyclic delays on the individual symbols of the respective antennas, in accordance with the set plurality of delay magnitudes; and outputting the cyclically delayed symbols from the antennas;

wherein as the delay magnitudes, a first delay magnitude at a first transmission timing and a second delay magnitude at a second transmission timing are different for one antenna, and the delay magnitudes are different in the respective antennas for one transmission timing.

According to the present invention, a frequency diversity and a time diversity are enhanced in a MIMO-OFDM transmission scheme, whereby a transmission apparatus, an access point and a symbol transmission method which raise a retransmission efficiency in a data retransmission mode can be provided.

According to the invention, in the process of an H-ARQ in fast radio communications, cyclic delay magnitudes are controlled by a cyclic delay controller, and OFDM signals cyclically delayed with delay magnitudes which are different in respective antennas and for respective H-ARQ retransmissions are transmitted, whereby the frequency characteristics of transmission signals can be respectively changed to obtain the frequency diversity. Thus, the influence of frequency-selective fading can be relieved, the number of times of H-ARQ retransmissions utilizing the time diversity is decreased, and the retransmission efficiency rises. That is, the time diversity can be raised.

Unlike broadcast communications for broadcast data, unicast communications in which data is communicated with an unspecified opposite party in one-to-one correspondence are furnished with a retransmission process such as H-ARQ, for a case where the data has not been successfully decoded on a reception side. Owing to the invention, a data omission in a specified path is prevented by the frequency diversity, whereby the number of times of the H-ARQ retransmissions can be decreased, a temporal retransmission efficiency rises, and fast radio communications of high reliability become possible.

BRIEF DESCRIPTION OF THE DRAWINGS

FIGS. 8A and 8B are diagrams for explaining a hybrid-ARQ (H-ARQ) retransmission mode in the case where the same H-ARQ retransmission data is transmitted in a manner to be synchronized by individual antennas; and FIGS. 9A and 9B are diagrams for explaining a hybrid-ARQ (H-ARQ) retransmission mode in the case where H-ARQ retransmission data is transmitted independently by the individual antennas.

DESCRIPTION OF THE PREFERRED
EMBODIMENTS

Now, an embodiment of the present invention will be described.

Figure 1:
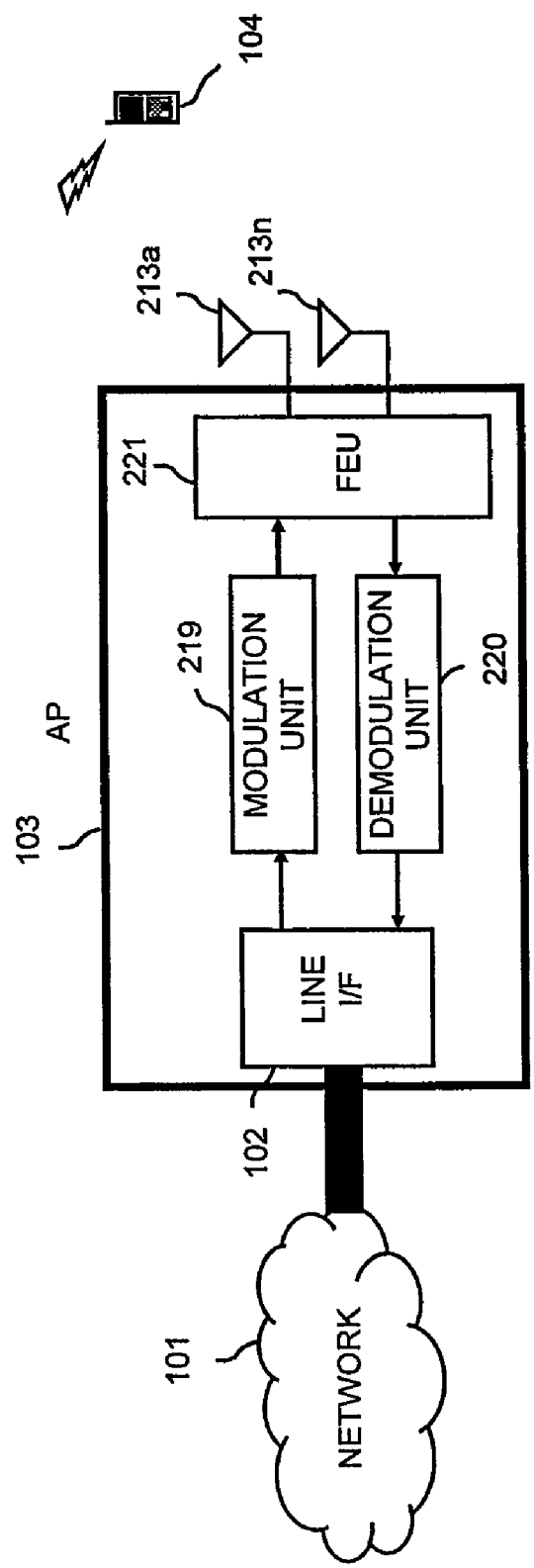
FIG. 1 is a block diagram showing the configuration of an access point in a MIMO-OFDM communication system.

FIG. 1 shows a configurational example of an access point in a MIMO-OFDM communication system according to this embodiment.

The access point of this system includes a line interface unit 102 which inputs/outputs data from/to a network 101, a modulation unit 219 to which the transmission data is inputted from the interface unit 102 and in which the MIMO-OFDM modulation of the transmission data is performed, a front end unit (FEU) 221 to which a modulated signal is inputted from the modulation unit 219 and in which the power amplification of the modulated signal is performed, a plurality of antennas 213a-213n to which transmission signals are inputted from the FEU 221 and which radiate the signals into a space, and a demodulation unit 220 to which signals received from the space by the antennas 213a-213n and then amplified by the FEU 221 are inputted so as to be demodulated, and which outputs the demodulated signals to the line interface unit 102. In this embodiment, the data is spatially multiplexed and is communicated by a plurality of paths between the access point 103 and a mobile terminal 104 in, for example, the orthogonal frequency division multiplexing (OFDM) communication system.

Figure 2:
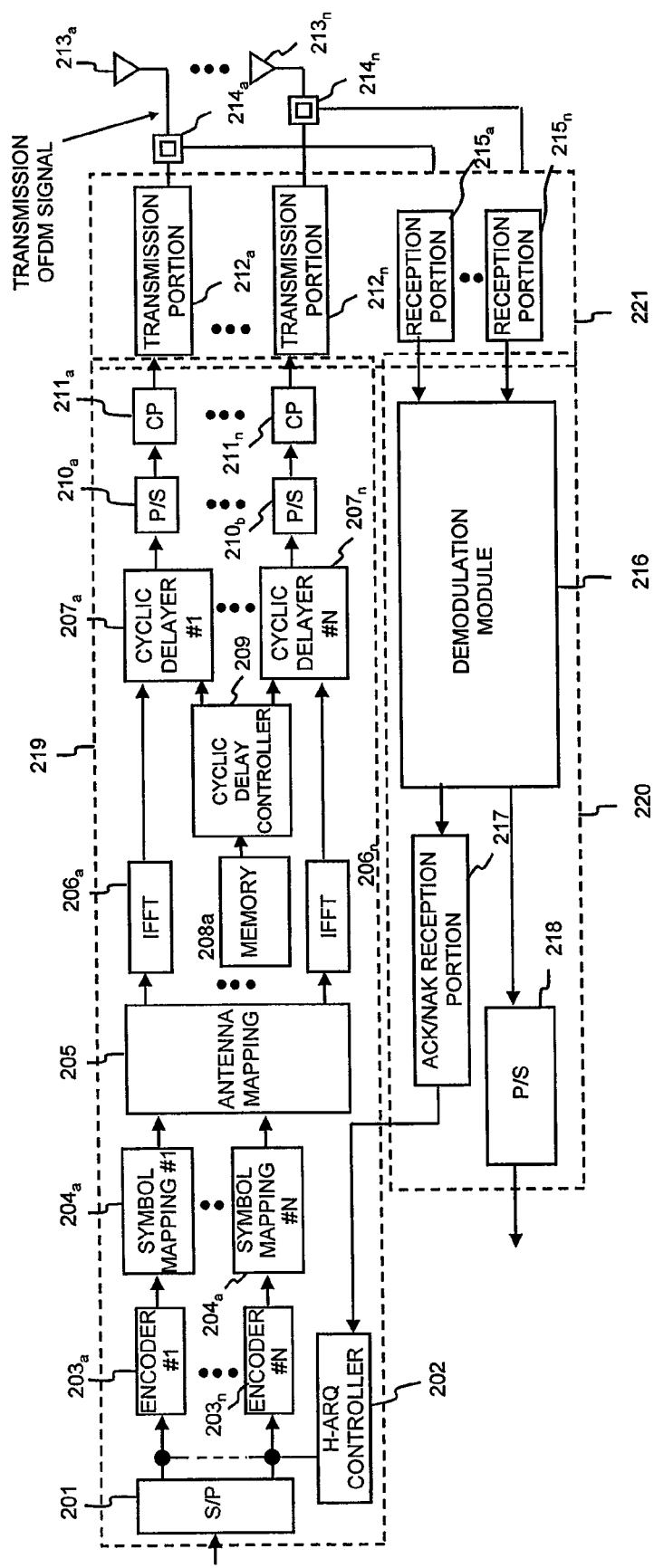
FIG. 2 is a block diagram (#1) of a transmission/reception unit in the access point of an OFDM mobile communication system in an example.
Figure 3:
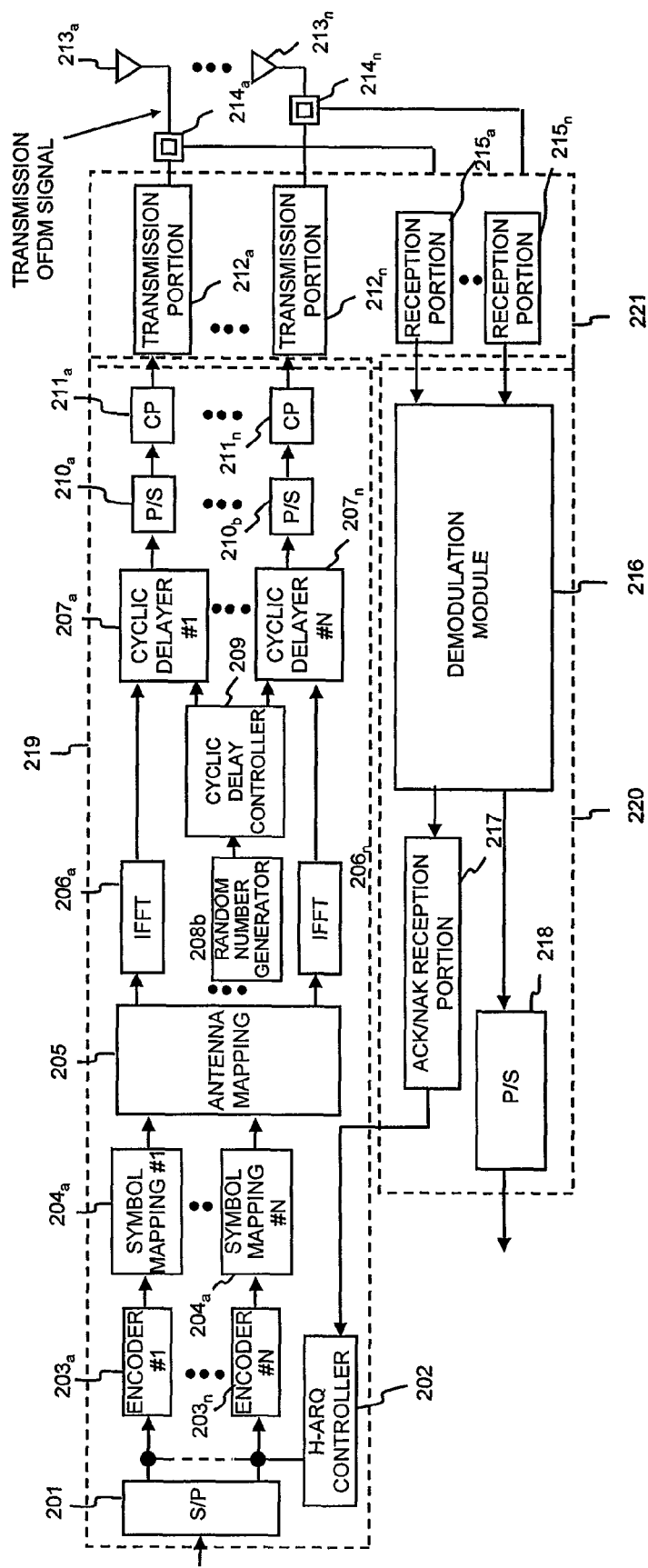
FIG. 3 is a block diagram (#2) of a transmission/reception unit in the access point of an OFDM mobile communication system in another example.

Each of FIGS. 2 and 3 is a functional block diagram showing the configurations of the modulation unit 219, demodulation unit 220 and FEU 221 of the access point.

The modulation unit 219 includes, for example, a serial/parallel (S/P) converter 201, a retransmission control portion (H-ARQ controller) 202, encoders 203, symbol mapping portions 204, an antenna mapping portion 205, inverse Fourier transform portions (IFFTs) 206, cyclic delayers 207, a memory 208a, a cyclic delay controller 209, parallel/serial (P/S) converters 210, and cyclic prefixers (CPs) 211. The demodulation unit 220 includes, for example, a demodulation module 216, an ACK/NAK reception portion 217 and a P/S converter 218. The FEU 221 includes, for example, transmission portion 212 and reception portions 215. Duplexers 214, for example, are interposed between the FEU 221 and the antennas 213.

The configuration shown in FIG. 3 includes a random number generator 208b instead of the memory 208a in FIG. 2. The remaining configuration is the same as in FIG. 2.

The data inputted from the line interface unit 102 is encoded via the S/P converter 201 and the encoders $203_a$-$203_n$ (203). By way of example, the data is encoded with turbo codes. On this occasion, the encoded data is stored in, for example, memories within the encoders $203_a$-$203_n$ for the purpose of retransmissions. Incidentally, any other appropriate memories may well be employed. Subsequently, in the symbol mapping portions $204_a$-$204_n$ (204), the transmission data is mapped on a complex plane and is subjected to a subcarrier modulation (for example, QAM modulation). Thereafter, the antenna mapping portion 205 performs a mapping in which transmission symbols to be transmitted are associated with the antennas. Inverse fast Fourier transforms are executed by the IFFTs $206_a$-$206_n$ (206), and the transmission symbols are transformed from the signals of a frequency region into those of a time region. By the way, in this embodiment, the encoders 203—the IFFTs 206 will sometimes be collectively called the "symbol generation portions" or "OFDM signal generation portions".

A plurality of cyclic delay patterns which contain a plurality of delay magnitudes different from one another, are stored in the memory 208a. A different or dispersed delay magnitude string (pattern) is fetched from the memory 208a by the cyclic delay controller 209 every transmission timing. The patterns different from one another are outputted from the cyclic delay controller 209 to the respective cyclic delayers $207_a$-$207_n$ (207) in synchronism with the transmission timing of, for example, the H-ARQ.

The random number generator 208b generates a random or dispersed delay magnitude string, and outputs this string to the cyclic delay controller 209. Apart from the fetch of the delay magnitude string from the memory 208a as stated above, the cyclic delay controller 209 may well set the delay magnitudes of the respective cyclic delayers 207 by inputting the delay magnitude string from the random number generator 208b every transmission timing as shown in FIG. 3.

A timing for altering the delay magnitudes may well be regularly changed into, for example, every transmission timing of a symbol or every transmission timing of a frame containing a plurality of symbols. Besides, the delay magnitudes may well be altered every transmission timing of retransmission data. Alternatively, the delay magnitudes may well be altered at appropriate timings at which the delay magnitudes differ between the timing for transmitting the original data and the timing for transmitting the retransmission data.

When the pattern signals and the output signals (symbols) from the IFFTs $206_a$-$206_n$ are inputted to the respective cyclic delayers $207_a$-$207_n$, the cyclic delays of the individual symbols are made. Incidentally, the details of the cyclic delays will be described later. The output signals from the cyclic delayers $207_a$-$207_n$ are converted into serial signals by the P/S converters $210_a$-$210_n$ (210), whereupon the serial signals are endowed with cyclic prefixes (CPs) by the cyclic prefixers $211_a$-$211_n$ (211). The transmission OFDM symbols endowed with the CPs are respectively upconverted by the transmission portion $212_a$-$212_n$ (212), and the resulting signals are respectively transmitted from the antennas $213_a$-$213_n$ (213) via the duplexers $214_a$-$214_n$ (214).

Besides, in a case where data has been transmitted from the terminal, it is received by the antennas $213_a$-$213_n$. Reception signals are downconverted by the reception portions $215_a$-$215_n$ (215) via the duplexers $214_a$-$214_n$. Thereafter, the resulting reception signals are subjected to a demodulation process by the demodulation module 216, and the resulting demodulated signal is outputted to the external network 101 through the line interface unit 102 via the P/S converter 218.

The ACK/NAK reception portion 217 receives an ACK signal (acknowledgment notification, namely affirmation signal) and an NAK signal (retransmission request, namely negation signal) from the mobile terminal 104. The H-ARQ controller 202 controls the retransmission of the data. In a case, for example, where the NAK signal has been received from the mobile terminal 104 or where the ACK signal has not been received within a predetermined time period since the transmission of the data to the mobile terminal 104, the H-ARQ controller 202 fetches and retransmits the transmission data stored in the encoders 203. On the other hand, in a case where the ACK signal has been received from the mobile terminal 104, the H-ARQ controller 202 erases the transmission data stored in the encoders 203.

Figure 4:
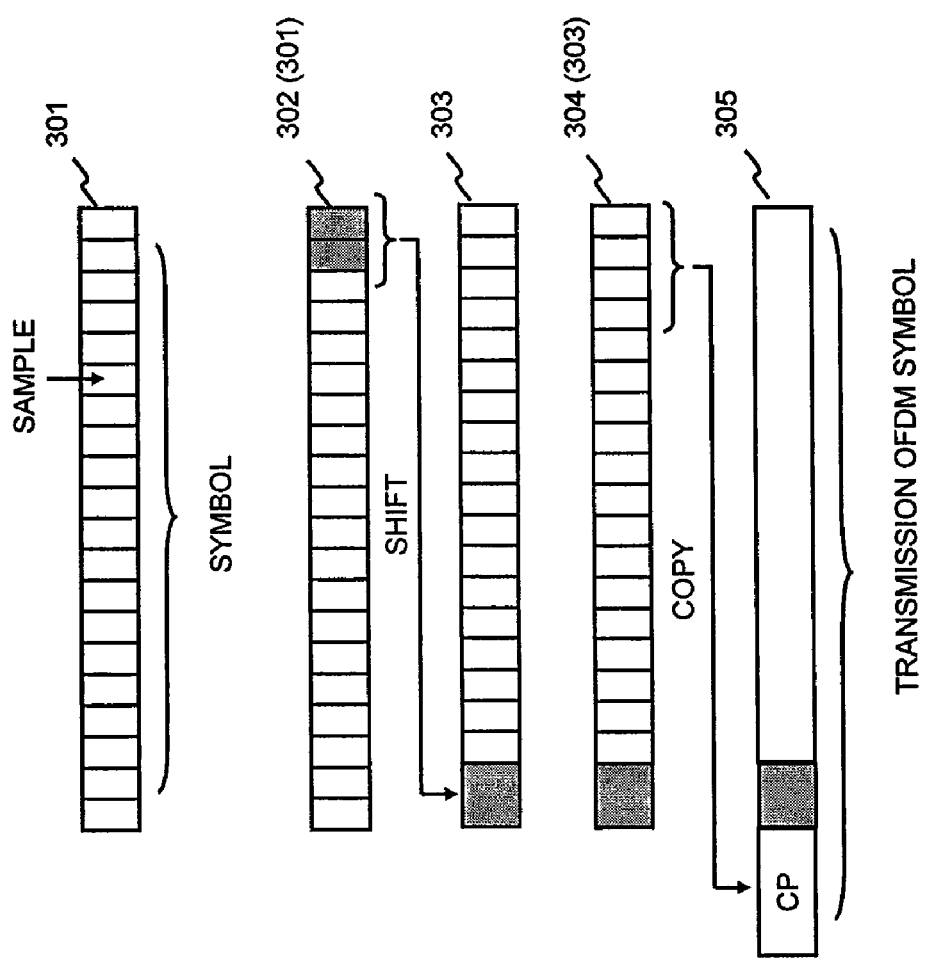
FIG. 4 is a diagram for explaining cyclic delays and cyclic prefixes (CPs)

FIG. 4 is a diagram for explaining the cyclic delays and the cyclic prefixes (CPs).

Referring to FIG. 4, a symbol 301 denotes that symbols outputted from the IFFTs $206_a$-$206_n$ contain a plurality of samples. Those samples of a symbol tail which correspond to the delay magnitude of a cyclic delay pattern controlled by the cyclic delay controller 209 are shifted to a symbol head by the cyclic delayers $207_a$-$207_n$ (302 and 303). The illustrated symbols 302 and 303 correspond to an example in which the delay magnitude is "2". Further, when a plurality of samples at a symbol tail as correspond to a CP length stipulated by specifications beforehand are copied at a symbol head, a transmission OFDM symbol 305 which is endowed with a CP for protection against any inter-symbolic interference is obtained (304 and 305).

FIGS. 8A and 8B and FIGS. 9A and 9B are diagrams (#1) and (#2) for explaining H-ARQ retransmission modes.

Each of FIGS. 8A and 9A shows a configurational example of the memory 208a.

By way of example, a plurality of delay patterns which contain a plurality of delay magnitudes different for the respective antennas are stored in the memory 208a every transmission timing. Regarding the delay magnitudes, by way of example, a delay magnitude 1a at a transmission timing "1", a delay magnitude 2a at a transmission timing "2", ..., and a delay magnitude Ma at a transmission timing "M" are respectively different for one antenna a. Incidentally, the letter M denotes a plus integer, and the M delay patterns can be repeatedly used. Besides, the delay magnitudes 1a, 1b, ..., and 1N of the individual antennas are respectively different for one transmission timing "1". These delay magnitudes can be stored in the memory 208a beforehand.

Each of FIGS. 8B and 9B shows a situation where the transmission data is outputted from the cyclic prefixers $211_a$-$211_n$. The transmission OFDM symbol contained in the H-ARQ retransmission data is cyclically delayed with a delay magnitude which is different from that of the last transmission mode. On the other hand, all the cyclic delay values of the transmission OFDM symbols within the identical H-ARQ retransmission data have the same values. A method for transmitting the H-ARQ retransmission data which is transmitted from the respective antennas is, for example, a 2-pattern method.

FIG. 8B corresponds to a case where the identical H-ARQ retransmission data is transmitted from the respective antennas at the same timings. The identical H-ARQ retransmission data whose cyclic delay values are different, are synchronized by the individual antennas and are transmitted from the respective antennas at the same retransmission timing. In addition to an effect based on the cyclic delays, the reliability of communications can be further heightened in proportion to the number of the antennas 213. The reliability of communications, for example, is higher than with patterns in FIGS. 9A and 9B to be stated later. For the realization of the H-ARQ retransmission in FIGS. 8A and 8B, a synchronization process is required in each of processes before the retransmission of the H-ARQ retransmission data (as including the processes of, for example, the encoders 203, the symbol mapping portions 204, the antenna mapping portion 205, the IFFTs 206, the cyclic delayers 207, the P/S portions 210, the CP portions 211, the transmission portion 212, the duplexers 214, and the antennas 213).

On the other hand, FIG. 9B corresponds to a case where the individual H-ARQ retransmission data is independently transmitted by the respective antennas. For the realization of the H-ARQ retransmission in FIGS. 9A and 9B, accordingly, the process may be executed in any of the portions 1-n in each of the processes (as stated before) before the retransmission of the H-ARQ retransmission data. By way of example, the process may be executed in any of the encoders #1-#n, or in any of the symbol mapping portions #1-#n. In the example FIG. 9B, the H-ARQ retransmission data (1) is processed by the encoder, etc. corresponding to the antenna a and is outputted from the antenna a, and the H-ARQ retransmission data (2) is processed by the encoder, etc. corresponding to the antenna b and is outputted from the antenna b. Besides, the transmission timings of the retransmission data (1) and (2) may well be different. With this method, in addition to an effect based on the cyclic delays, communications at a throughput higher than in the case of FIGS. 8A and 8B are expected.

At the individual H-ARQ retransmissions, the patterns of cyclic delay values are different (independent) for the respective antennas. All of the delay values are plus integers, and they are the pattern values of the respective antennas accumulated in the memory 208a as shown in FIG. 2 or the random values generated by the random number generator 208b as shown in FIG. 3. These values are invoked by the cyclic delay controller 209 in synchronism with, for example, the timings of the cyclic delays.

Figure 5:
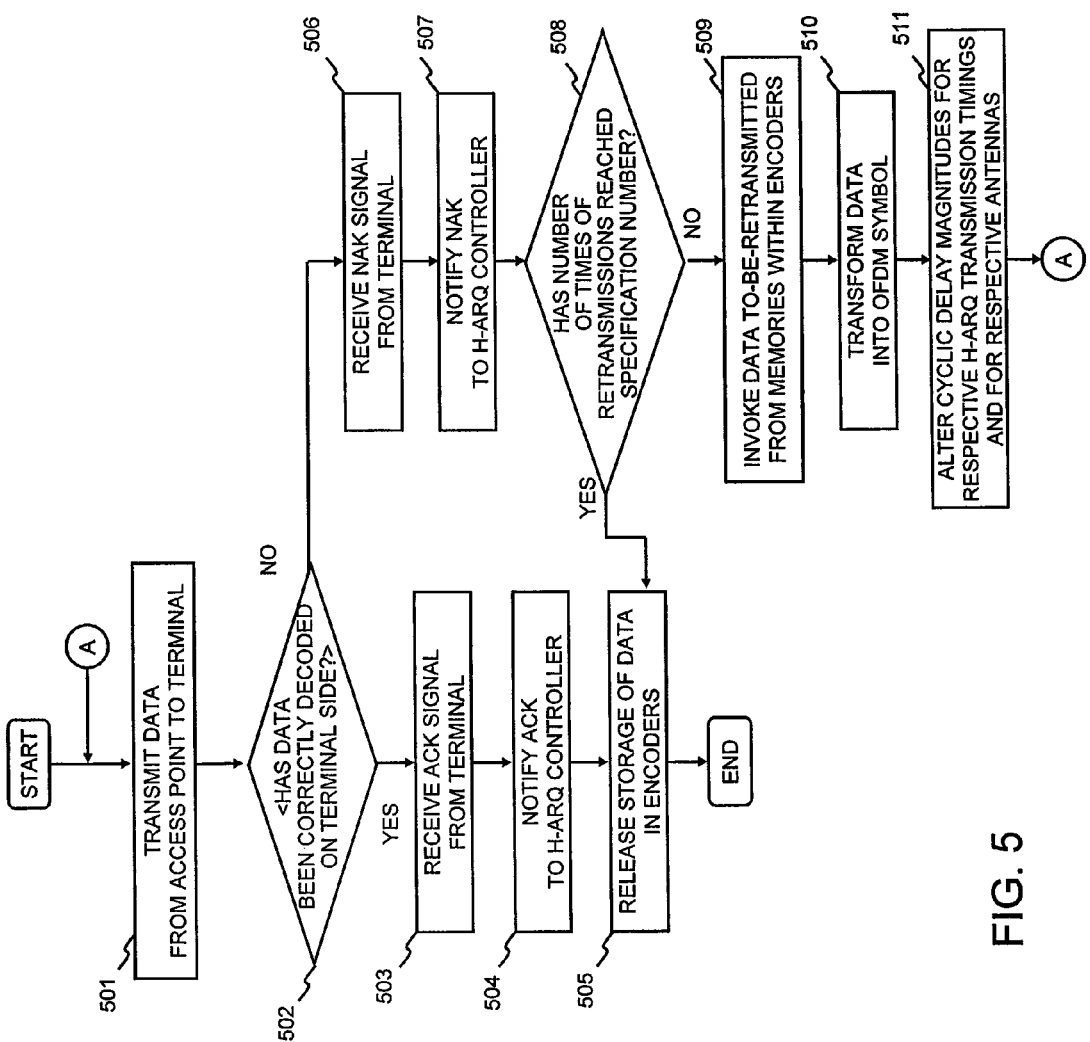
FIG. 5 is a flow chart of the data transmission/reception between the access point and a terminal.

FIG. 5 shows a flow chart of the data transmission/reception between the access point and the terminal.

Signals upconverted by the transmission portion $212_a$-$212_n$ in FIG. 2 or FIG. 3 are transmitted from the access point 103 toward the terminal (step 501). Data transmitted from the access point 103 is received and modulated by the mobile terminal 104. On that occasion, the mobile terminal 104 performs a CRC check so as to decide if a packet has been correctly decoded (step 502). When the CRC check is "OK" (that is, when the packet has been correctly decoded), the mobile terminal 104 returns an ACK signal to the access point 103, whereas when the CRC check is "NG" (that is, when the packet has not been correctly decoded), the mobile terminal 104 returns an NAK signal to the access point 103. When the packet has been correctly decoded, the ACK signal is transmitted from the mobile terminal 104 toward the access point 103, and the access point 103 receives this ACK signal (step 503). After the ACK signal has been received by the ACK/NAK reception portion 217, it is notified to the H-ARQ controller 202 (step 504). Thereafter, the storage of the data having been retained in the encoders $203_a$-$203_n$ in the last encoding is released (step 505), and the transmission process for the data is ended.

On the other hand, when the packet has not been correctly decoded on the terminal side, the NAK signal is transmitted from the mobile terminal 104 toward the access point 103, and the access point 103 receives this NAK signal (step 506). After the NAK signal has been received by the ACK/NAK reception portion 217 of the access point 103, it is notified to the H-ARQ controller 202 (step 507).

Here, if the number of times of retransmissions has reached a predetermined specification number ("Yes" at a step 508), the access point 103 shifts to the step 505, at which the storage of the data having been retained in the encoders $203_a$-$203_n$ in the last encoding is released (step 505), and the transmission process for the data is ended. If the number of times of retransmissions has not reached the specification number ("No" at the step 508), the access point 103 invokes from the memories, the data having been retained in the encoders $203_a$-$203_n$ in the last encoding (step 509). The invoked encoded data is transformed into an OFDM symbol by the IFFTs $206_a$-$206_n$ via the above transmission process (step 510), and is cyclically delayed for the respective H-ARQ transmissions and the respective antennas again by the cyclic delayers $207_a$-$207_n$ (step 511). Delay magnitudes here are different from the delay magnitudes with which the data have been transmitted to the terminal at the last transmission timing (for example, the delay magnitudes in the case of transmitting the data at the step 501). The data endowed with the cyclic delays is transmitted from the access point to the terminal again (step 501).

Figure 6:
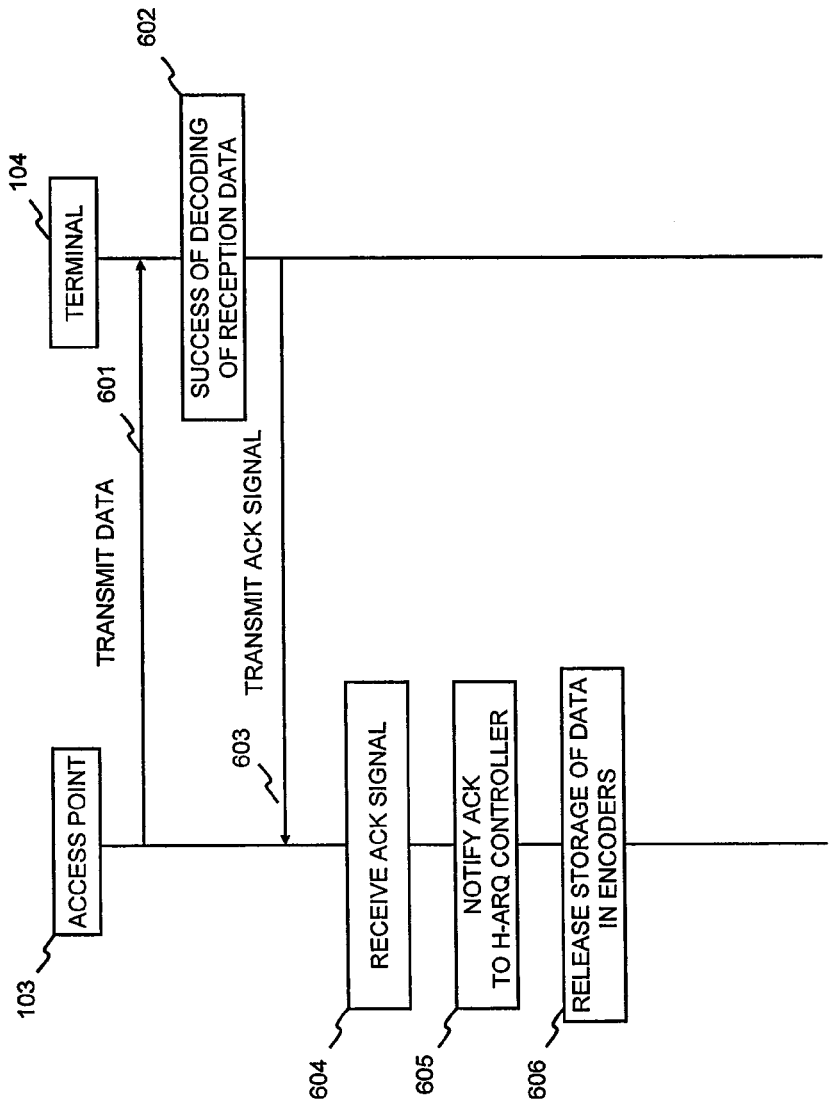
FIG. 6 is a sequence diagram in the case where an acknowledgment signal (ACK) is returned.

FIG. 6 shows a sequence diagram of the flow of signals in the case where the ACK signal has been returned.

The data is transmitted from the access point 103 (step 601), and is received by the mobile terminal 104. Subsequently, when the data is correctly decoded (step 602), the ACK signal is transmitted from the mobile terminal 104 to the access point 103 (step 603). Thereafter, when the ACK signal is received by the ACK/NAK reception portion 217 (step 604), the ACK is notified to the H-ARQ controller 202 (step 605). Thereafter, the storage of the data having been retained in the encoders 203$_a$-203$_n$ in the last encoding is released (step 606), and the transmission process for the data is ended.

Figure 7:
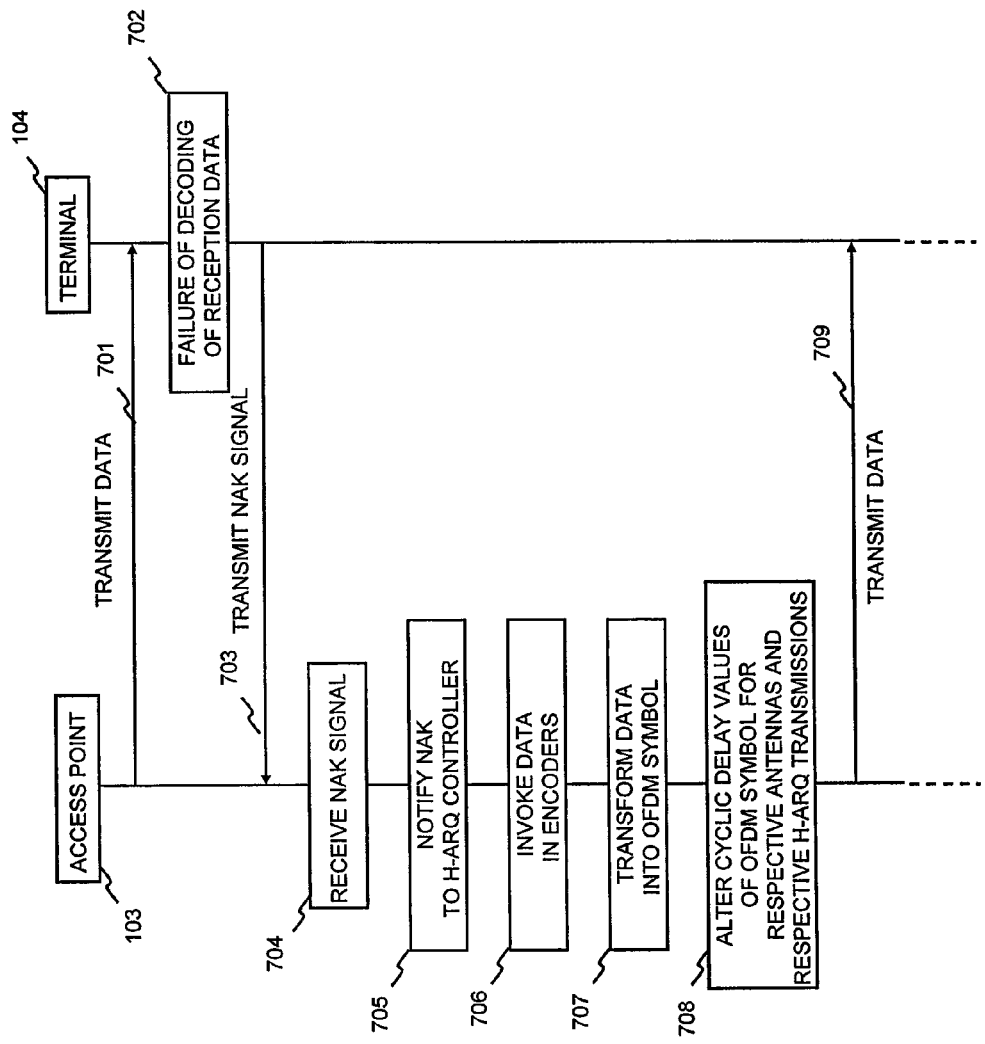
FIG. 7 is a sequence diagram in the case where a negative acknowledgment signal (NAK) is returned.

FIG. 7 shows a sequence diagram of the flow of signals in the case where the NAK signal has been returned.

The data is transmitted from the access point 103 (step 701), and is received by the mobile terminal 104. Subsequently, when the decoding of the data fails (step 702), the NAK signal is transmitted from the mobile terminal 104 to the access point 103 (step 703). Thereafter, when the NAK signal is received by the ACK/NAK reception portion 217 (step 704), the NAK is notified to the H-ARQ controller 202 (step 705). Thereafter, in a case where the number of times of retransmissions has not reached the specification number, the data having been retained in the encoders 203$_a$-203$_n$ in the last encoding is invoked from the memories (step 706). The invoked encoded data is transformed into an OFDM symbol by the IFFTs 206$_a$-206$_n$ via the above transmission process (step 707), the cyclic delay magnitudes of the OFDM symbol are altered for the respective H-ARQ transmissions and the respective antennas again by the cyclic delayers 207a-207n (step 708), and the data is transmitted from the access point to the terminal again (step 709). Such series of retransmission processes are repeated until the number of times of retransmissions reaches the specification number.

In this embodiment, owing to the above processing, the cyclic delays of the delay magnitudes differing for the respective transmissions are bestowed on the respective antennas, so that a frequency characteristic changes to afford frequency and time diversities. In the MIMO-OFDM, accordingly, a fixed recession in a specified channel does not occur, and the number of times of data retransmissions can be decreased, so that the averaged throughput of the access point can be enhanced.

The present invention is applicable to, for example, a MIMO-OFDM communication system.

What is claimed is:

1. A transmission apparatus which transmits and retransmits data by employing a cyclic diversity in a communication system wherein data are spatially multiplexed using a plurality of antennas and wherein communications are performed by orthogonal frequency division multiplexing, comprising:
    a symbol generation portion which multiplexes data by orthogonal frequency division multiplexing, and assigns the plurality of antennas to the data to generate symbols of respective antennas;
    a cyclic delay controller which sets a plurality of delay magnitudes different for the respective antennas, for each predetermined timing;
    a cyclic delayer which cyclically delays the individual symbols of the respective antennas, in accordance with the plurality of delay magnitudes set by said cyclic delay controller;
    a transmission portion which outputs the cyclically delayed symbols to the antennas; and
    a random number generator which generates the plurality of delay magnitudes which are random or dispersed,
    wherein said cyclic delay controller sets the plurality of delay magnitudes from said random number generator, in said cyclic delayer for each predetermined timing,
    wherein as the delay magnitudes, a first delay magnitude at a first transmission timing and a second delay magnitude at a second transmission timing are different for one antenna, and the delay magnitudes are different in the respective antennas for one transmission timing.

2. The transmission apparatus as defined in claim 1, wherein
    the predetermined timing is any of a transmission timing of one of the symbols, a transmission timing of a frame having a plurality of symbols, and a transmission timing of retransmission data.

3. The transmission apparatus as defined in claim 1, further comprising
    a retransmission control portion which retransmits data transmitted at the first transmission timing, at the second transmission timing.

4. The transmission apparatus as defined in claim 1, wherein
    identical retransmission data is endowed with delay magnitudes different for the respective antennas, and the resulting data are transmitted from the plurality of antennas with transmission timings synchronized.

5. The transmission apparatus as defined in claim 1, wherein
    a plurality of retransmission data are independently transmitted from any of the plurality of antennas.

6. An access point comprising:
    a transmission apparatus which transmits and retransmits data by employing a cyclic diversity in a communication system wherein data are spatially multiplexed using a plurality of antennas and wherein communications are performed by orthogonal frequency division multiplexing, the transmission apparatus comprises
    a symbol generation portion which multiplexes data by orthogonal frequency division multiplexing, and assigning the plurality of antennas to the data to generate symbols of respective antennas,
    a cyclic delay controller which sets a plurality of delay magnitudes different for the respective antennas, for each predetermined timing,
    a cyclic delayer which cyclically delays the individual symbols of the respective antennas, in accordance with the plurality of delay magnitudes set by said cyclic delay controller;
    a transmission portion which outputs the cyclically delayed symbols to the antennas, and
    a random number generator which generates the plurality of delay magnitudes which are random or dispersed,
    wherein said cyclic delay controller sets the plurality of delay magnitudes from said random number generator, in said cyclic delayer for each predetermined timing,
    wherein as the delay magnitudes, a first delay magnitude at a first transmission timing and a second delay magnitude at a second transmission timing are different for one antenna, and the delay magnitudes are different in the respective antennas for one transmission timing; and
    a reception apparatus which receives an acknowledgment notification that indicates data transmitted by the transmission apparatus has been normally received by a terminal, and/or a retransmission request that makes a request for retransmission of the data due to failure of the normal reception of the data at the terminal, from the terminal through the antennas;

wherein the data is retransmitted from the transmission apparatus to the terminal in a case where the acknowledgment notification is not received from the terminal within a predetermined time period, or in a case where the retransmission request has been received.

7. A symbol transmission method which transmits and retransmits data by employing a cyclic diversity in a communication system wherein data are spatially multiplexed using a plurality of antennas and wherein communications are performed by orthogonal frequency division multiplexing, the symbol transmission method comprising the steps of:
multiplexing data by orthogonal frequency division multiplexing, and assigning the plurality of antennas to the data to generate symbols of respective antennas;
generating a plurality of delay magnitudes which are random or dispersed;
setting the plurality of delay magnitudes different for the respective antennas, for each predetermined timing;
cyclically delaying the individual symbols of the respective antennas, in accordance with the set plurality of delay magnitudes; and
outputting the cyclically delayed symbols to the antennas;
wherein as the delay magnitudes, a first delay magnitude at a first transmission timing and a second delay magnitude at a second transmission timing are different for one antenna, and the delay magnitudes are different in the respective antennas for one transmission timing.

* * * * *